Figure 1:
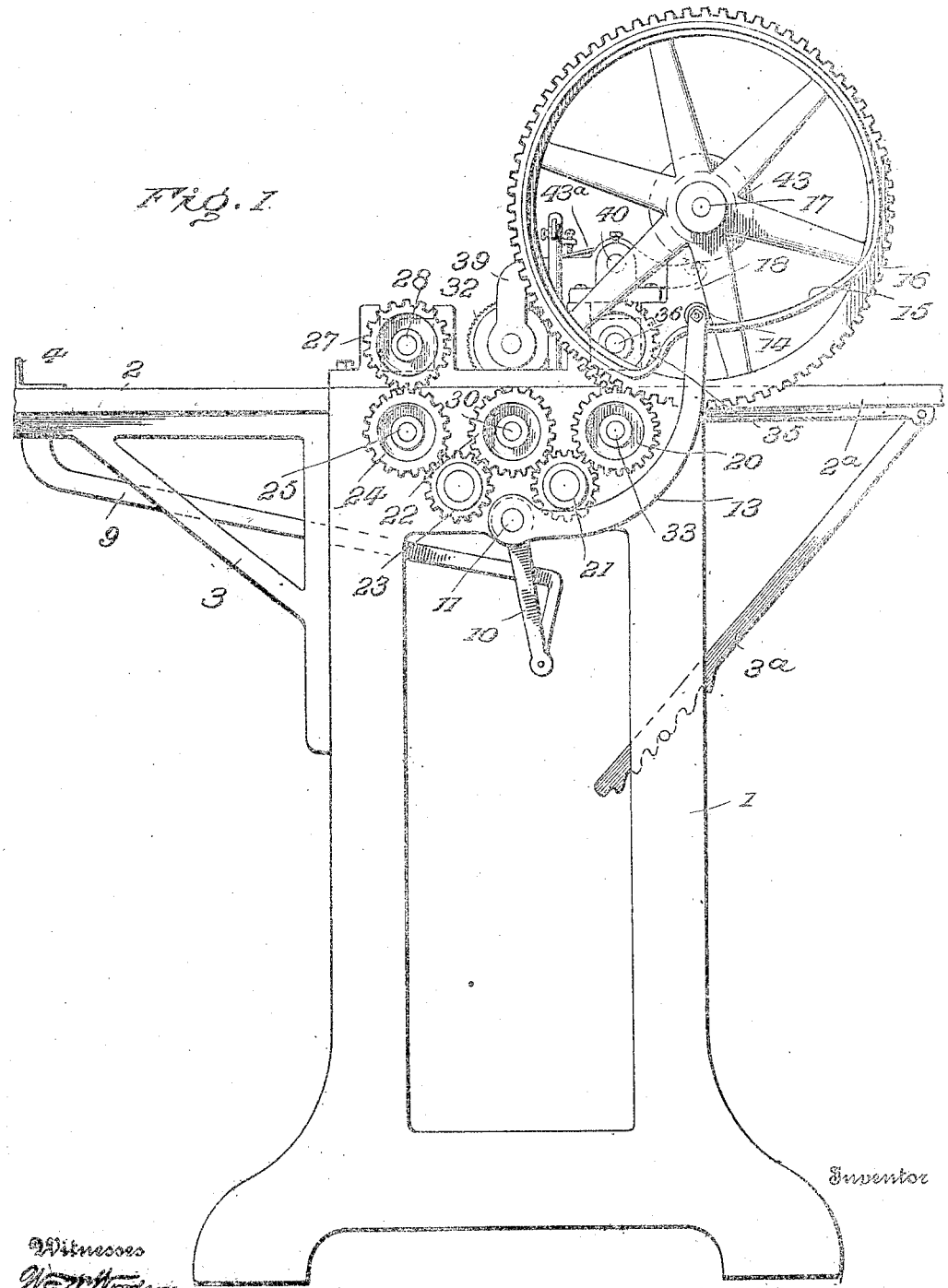

G. A. HOUSAM.
PERFORATING MACHINE.
APPLICATION FILED NOV. 17, 1910.

995,868.

Patented June 20, 1911.

6 SHEETS—SHEET 1.

Witnesses

Inventor
G. A. Housam
By
Attorneys

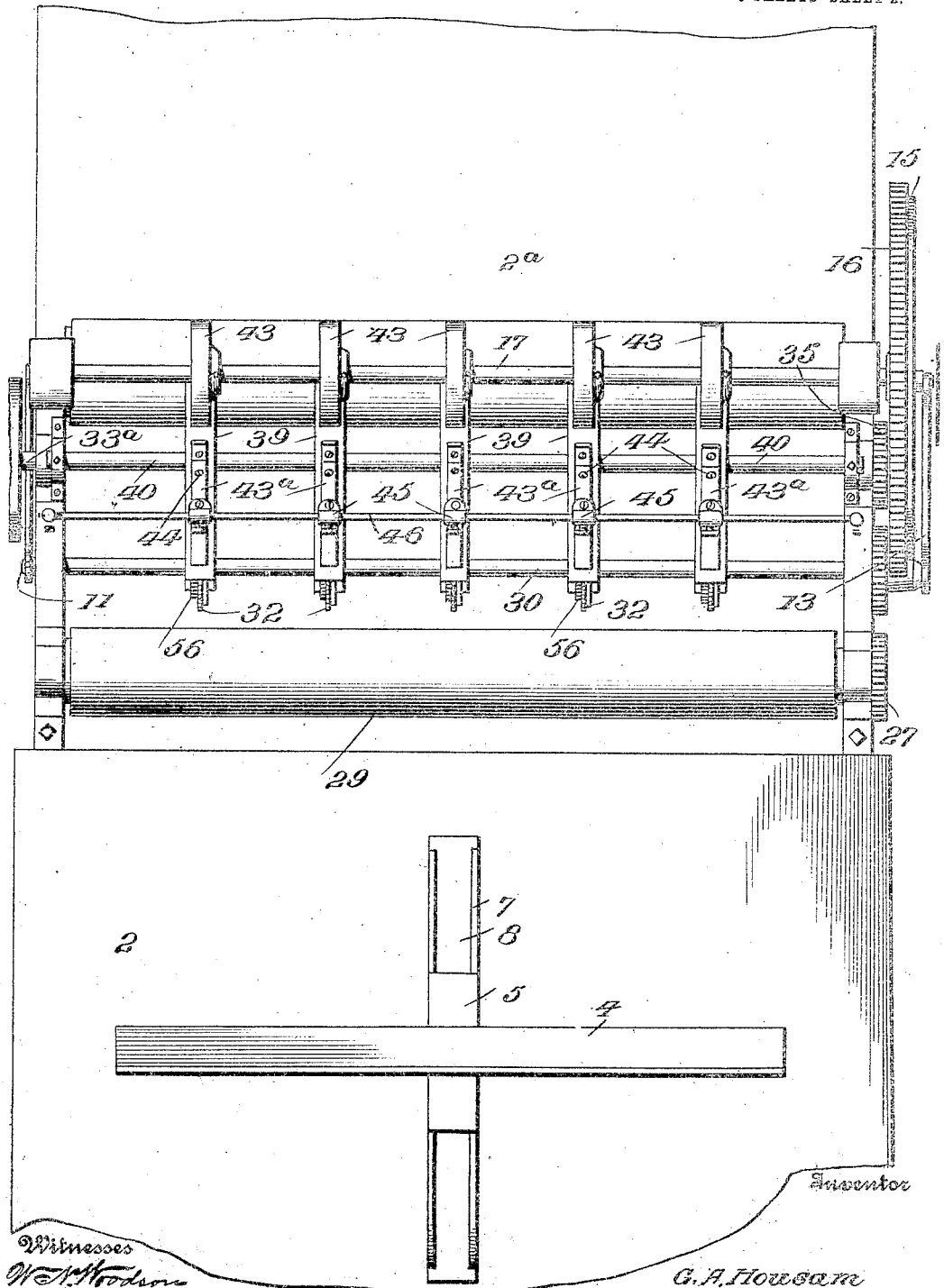

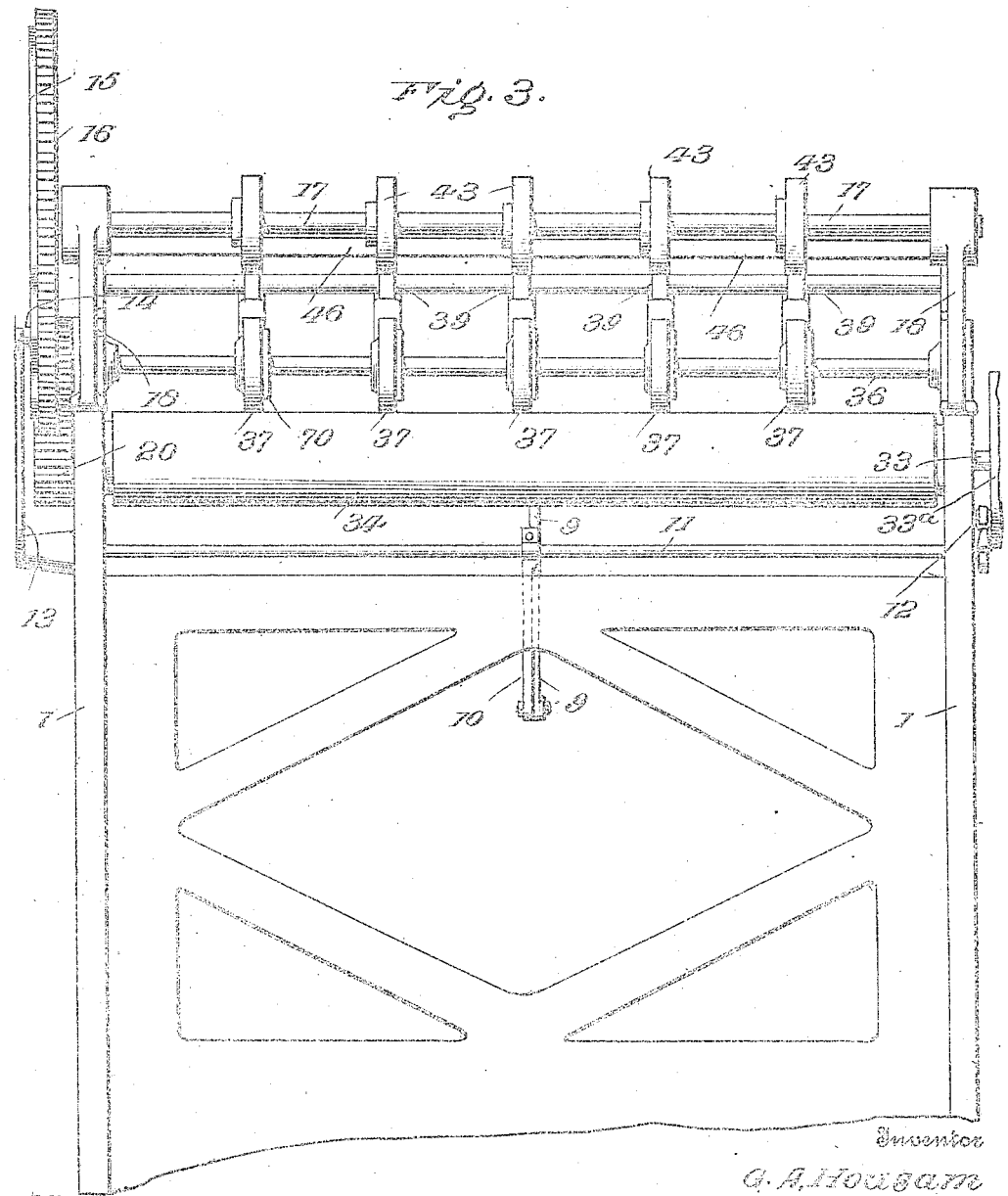

G. A. HOUSAM.
PERFORATING MACHINE.
APPLICATION FILED NOV. 17, 1910.
995,868.
Patented June 20, 1911.
6 SHEETS—SHEET 4.
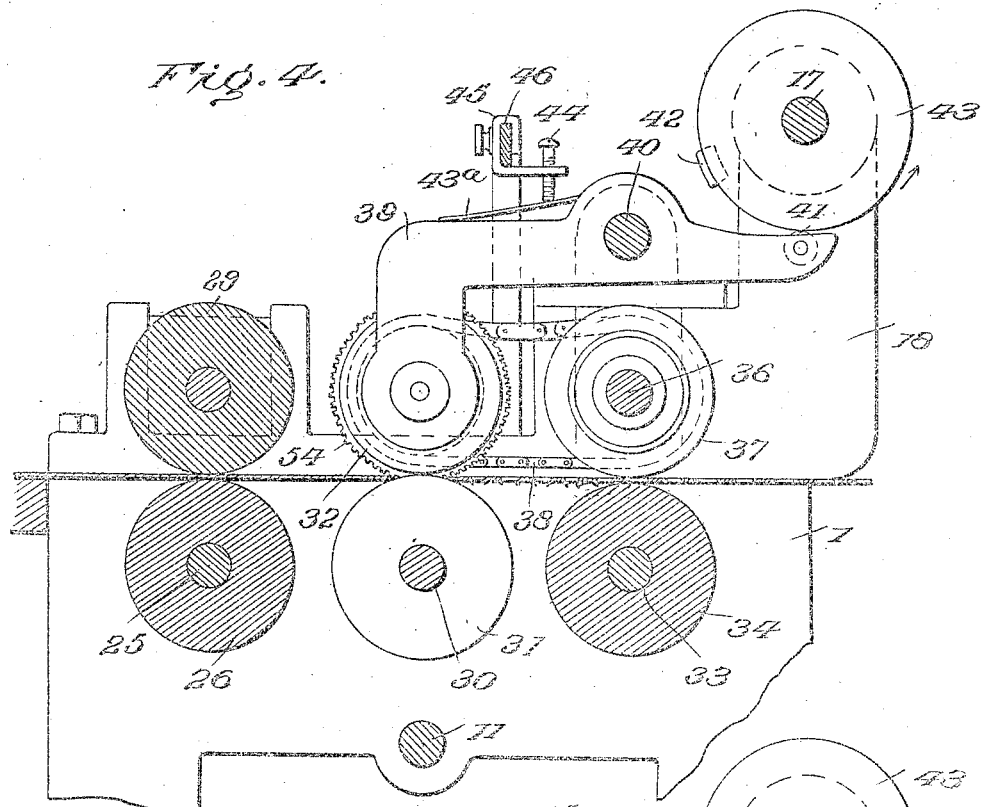
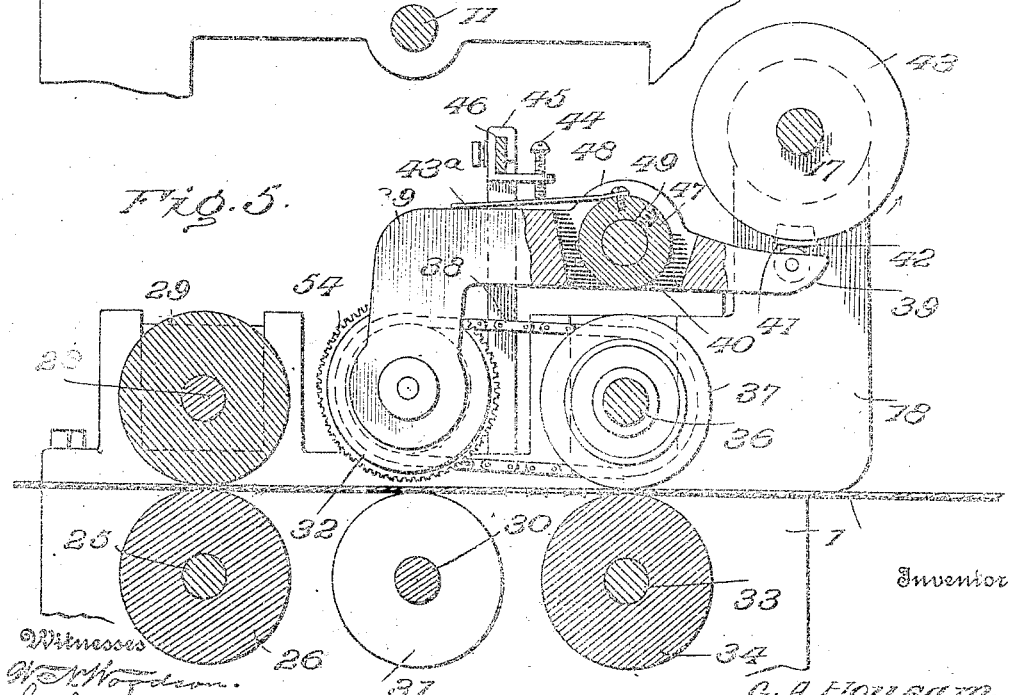

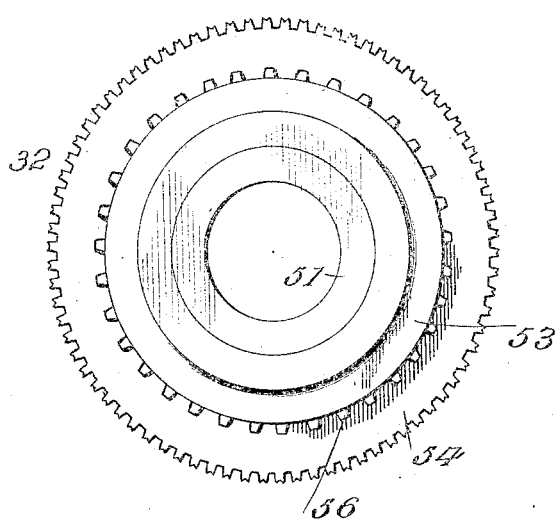
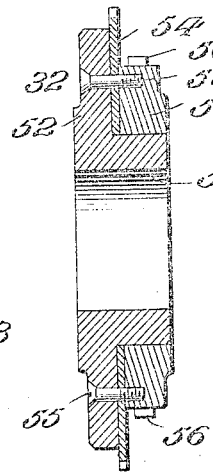
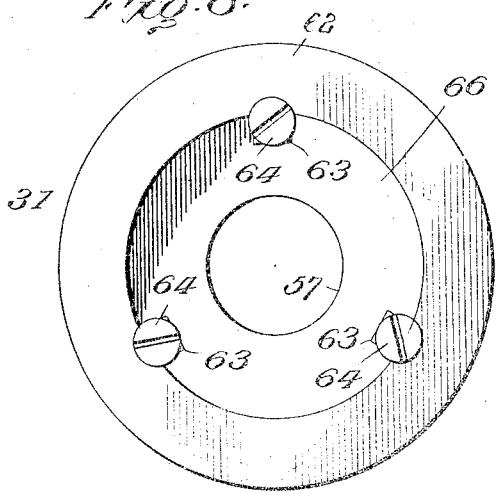
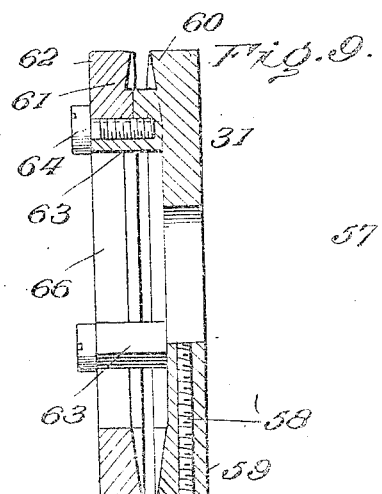
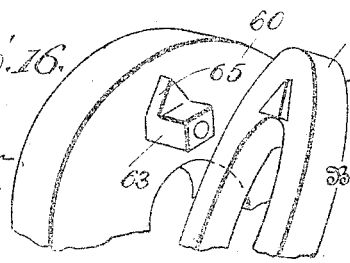

G. A. HOUSAM.
PERFORATING MACHINE.
APPLICATION FILED NOV. 17, 1910.

995,868.

Patented June 20, 1911.

6 SHEETS—SHEET 6.

Witnesses

Inventor
G. A. Housam
By _____, Attorneys

UNITED STATES PATENT OFFICE.

GEORGE A. HOUSAM, OF BENTON HARBOR, MICHIGAN.

PERFORATING-MACHINE.

995,868.   Specification of Letters Patent.   Patented June 20, 1911.

Application filed November 17, 1910. Serial No. 592,909.

*To all whom it may concern:*

Be it known that I, GEORGE A. HOUSAM, a citizen of the United States, residing at Benton Harbor, in the county of Berrien and State of Michigan, have invented certain new and useful Improvements in Perforating-Machines, of which the following is a specification.

This invention comprehends certain new and useful improvements in cutting, scoring, or perforating machines of the rotary type, and is designed particularly for use in perforating paper, although it is to be understood that the invention is equally applicable for cutting, scoring, or otherwise weakening sheets of various substances.

The invention also comprehends, more specifically considered, improvements in machines of that class that are designed for either straight line or what is known as stub or skipping work, where, for instance the sheets fed into the machine are perforated for a predetermined distance and left unperforated or intact for a predetermined distance, either at the front or rear edge of the sheet or at some other portion thereof, this work being most commonly employed in forming sheets for check books, where the stub portion of a sheet is not intended to be separated into its different stub portions, but remains intact after the perforated series of checks are detached.

My invention has for its primary object a machine of this character in which the perforating or scoring heads are independently driven and are independently controllable for skipping, whereby any one of the series of cutter-heads may be arranged to perform straight line work and the one next to it, or others, may at the same time be performing stub line or skipping work.

The invention also has for its object improved means for smoothing out the bur by rolling down the raw edges, said means being arranged to drive the male dies or cutters, and thereby subserving a double function.

Another object of the invention is an improved construction and arrangement of smoothing rollers that are direct driven from a shaft and gears and not by frictional pressure.

The invention has for a further object an improved feed gage which is positively driven ahead by cranks and cams instead of by springs or the like, the gage being returned by a weight or its equivalent, the feed being thereby more positive in its action and including a positive and steady initial stroke and a quick return stroke.

The invention has for a still further object an improved construction of female cutter or die, the slot of which will be self-clearing and will effectually discharge the small bits of paper or the like that are cut from the sheet in the perforating operation.

Another object of the invention is an improved construction and arrangement of strippers, the same comprising sprocket drive chains arranged to rotate the independently movable and controllable male dies or cutters, the series of driving chains turning in such a direction that their stretches contiguous to the sheet passing through the machine will travel the same way as the sheet and will properly strip the sheet and prevent it from curling up around the male disk or cutters, the sprocket chains also operating in such a manner as to avoid creating any friction on the paper, thereby entirely eliminating one cause of wrinkling, which is a disadvantageous feature incidental to most paper perforating machines, particularly those of the rotary type. And another object of the invention is to generally improve this class of machines and to make them more sure, positive, and otherwise efficient in operation and more commercially desirable.

With these and other objects in view as will more fully appear as the description proceeds, the invention consists in certain constructions, arrangements and combinations of the parts that I shall hereinafter fully describe and claim.

Figure 10:
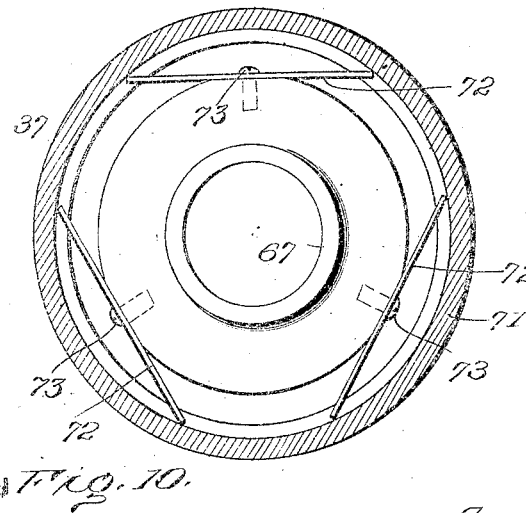
Figure 11:
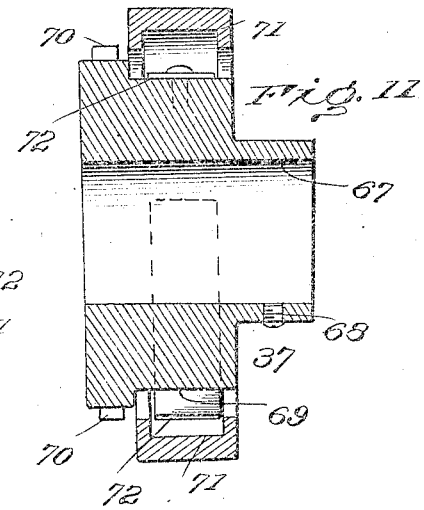
Figure 12:
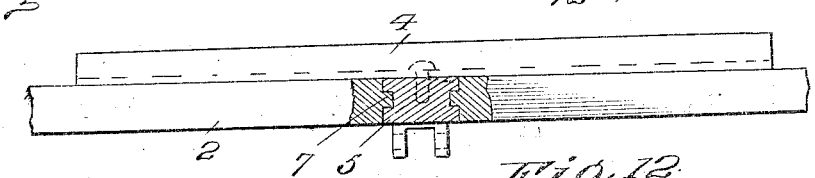
Figure 13:
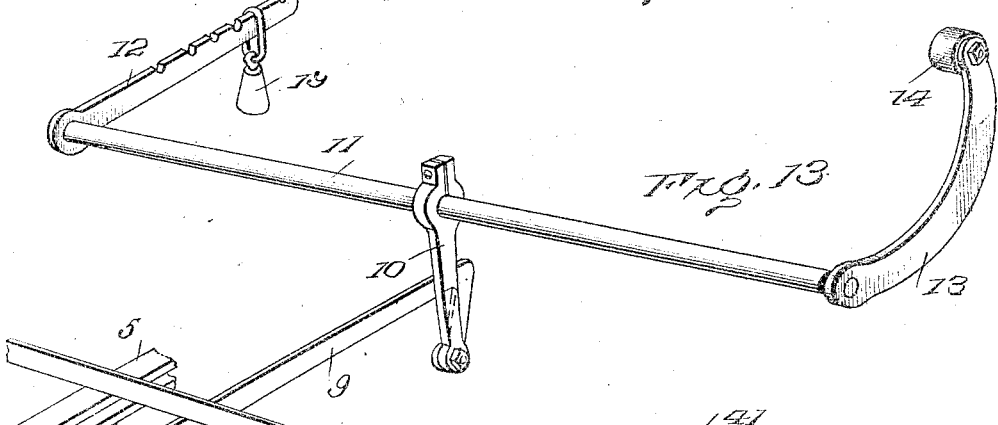
Figure 14:
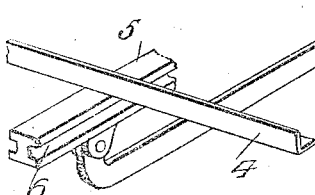
Figure 15:
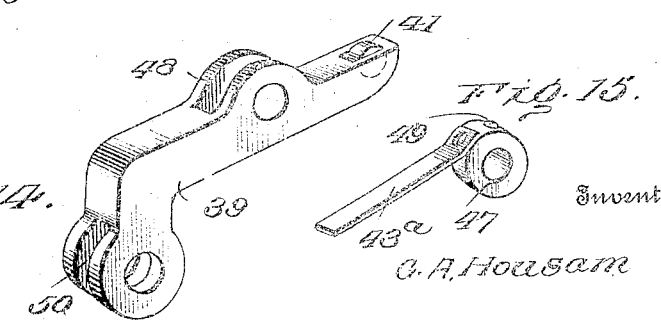

For a full understanding of the invention, reference is to be had to the following description and accompanying drawings, in which:

Figure 1 is a side elevation of a paper perforating machine embodying the improvements of my invention; Fig. 2 is a top plan view thereof; Fig. 3 is a rear elevation; Figs. 4 and 5 are enlarged transverse sectional views, illustrating, respectively, one of the male dies or cutters in lowered operative contact with the sheet and in raised inoperative position for skipping a portion of the sheet, the sheet being illustrated passing through the machine both before it has been acted upon by the perforating devices and after the smoothing rollers have taken out the burs; Fig. 6 is a detail side view of the male die; Fig. 7 is a diametrical sectional view thereof; Fig. 8 is a side view of the female die; Fig. 9 is a transverse sectional view of such die; Fig. 10 is a sectional side elevation of one of the smoothing rollers; Fig. 11 is a transverse sectional view thereof; Fig. 12 is a detail view of the feed table employed, the cross head for operating the sliding gage being shown in section; Fig. 13 is a detail perspective view of the gage actuating devices; Fig. 14 is a detail perspective view of one of the male die supporting arms; Fig. 15 is a similar view of a set collar and a spring for said arms; and, Figs. 16 and 17 are fragmentary views of the female die.

Corresponding and like parts are referred to in the following description and indicated in all the views of the drawings by the same reference characters.

The framework of my improved machine may be of any desired construction or design and is shown as embodying side frames or standards 1 connected by spreader castings of conventional type.

2 designates the feed table which is designed to support the sheets as they are being fed into the machine, said table being supported in any desired way, as by brackets, one of which is shown at 3 in Fig. 1.

In order to feed the sheets into the machine, I have provided a gage bar 4, preferably of angle iron, said gage bar being secured to a cross head 5 which is formed with side grooves 6 by which it is mounted to slide on the guide rails 7 that are formed at opposite sides of a slot 8, said slot extending longitudinally of the table, as best illustrated in Fig. 2. The cross head 5 is connected by a pitman 9 to a crank 10 which is secured to a transverse shaft 11, preferably at about the middle of said shaft. The shaft 11 is journaled in the side frames 1 and is provided at one end with a weighted arm 12 designed to return the shaft 11 back to its initial position after being operated by means of a crank 13 that is secured to the opposite end of said shaft and that carries a roller 14 engaging a cam 15 formed on or secured to a relatively large gear wheel 16. The gear wheel 16 is secured to one end of a transverse shaft 17 mounted in bearing brackets 18 projected upwardly from the supporting frames 1 at the rear ends thereof. As the wheel 16 turns, the reversely curved or active portion of the cam 15 will engage the roller 14 and swing the crank 13 upwardly and forwardly with a relatively quick and positive movement, the shaft 11 being thereby turned about its longitudinal axis to move the cross head and gage bar inwardly and thereby feed into the machine the sheet laid on the table with its rear edge resting on the gage bar. In the continued rotation of the wheel 16 and its cam 15, the weighted arm 12 will be permitted to act quickly to return the cross head and gage bar to their initial position, when the active portion of the cam 15 recedes from the roller 14 and permits the weighted arm 12 to act. Preferably, the inwardly curved portion of the cam 15 is so proportioned that its working surface is an arc of relatively large radius, while the releasing surface is abrupt, this insuring that the sheet will be fed in at a proper speed and in a positive manner without wrinkling or becoming rumpled, while the subsequent return movement of the cross head and gage bar will be relatively rapid. If desired, the arm 12 may carry an adjustable weight 19, as best illustrated in Fig. 13.

A spur pinion 20 meshes with and drives the gear wheel 16, said pinion also meshing with an idler pinion 21 which in turn meshes with a pinion 22 arranged to drive, by means of an idler 23, a pinion 24. See Fig. 1. The pinion 24 is secured to one end of a transverse shaft 25 which extends entirely across the machine, a lower feed roller 26 being secured to said shaft, as best illustrated in Figs. 4 and 5 which should now be read in connection particularly with Fig. 1. The pinion 24 meshes with a corresponding pinion 27, the latter being secured to one end of a transverse shaft 28 also extending entirely across the machine and carrying the upper feed roller 29. Preferably, the shaft 28 is mounted in vertically adjustable bearings, so that the feeding action of the two rollers 26 and 29 may be properly controlled. The idlers 21 and 23 are preferably mounted on stub shafts. The pinion 22 which is driven from one of the idlers and drives the other, is mounted on one end of a transverse shaft 30 extending entirely across the machine, said shaft having secured to it any desired number of female dies or cutters 31 arranged in any desired spaced relation to each other. Coacting with the female dies 31 and mounted above the same are a corresponding number of male dies 32 which are herein shown as perforating dies, although it is to be understood that my invention is not limited in this regard and that, particularly in the claims, the word die or cutter is to be construed as comprehending and covering a device capable of weakening a sheet in any way, either by cutting, scoring or perforating. The pinion 20 is secured to a transverse shaft 33 which also extends entirely across the machine, said shaft carrying a supporting roll 34. This last named pinion is of such width that it not only engages the teeth of the gear wheel 16, but also engages the teeth of a pinion 35 which is secured to one end of a transverse shaft 36 extending entirely across the framework of a machine, said shaft 36 carrying a number of smoothing rollers 37 that are designed to co-act with the supporting roller 34 in the bur removing operation. These smoothing rollers 37 also serve an additional function, namely, that of actuating the independently driven and controllable male dies 32, and for this purpose the rollers 37 and dies 32 are respectively provided with sprocket teeth hereinafter more specifically referred to and designated by reference numerals, chains 38 extending around the sprocket wheels of the corresponding rollers and dies, as best illustrated in Figs. 4 and 5, the lower stretches of the sprocket wheels traveling in the same direction as the sheet passing through the machine, and thereby not only avoiding friction on the paper and eliminating the main cause of wrinkling, but also serving to effectively strip the sheet from the male dies.

For the sake of clearness, I have first described and thus far set forth the general construction and correlated arrangement of some of the principal parts of my invention, and will now describe the general operation thereof, reserving the latter part of the specification for a more detail description of some of the elements.

From the foregoing description, in connection with the accompanying drawings, it will be understood that as the sheet is fed into the machine by the gage bar 4, it will be caught by the feeding-in rollers 26 and 29 and will be passed thereby to the dies, the sheet traveling in between the male dies and their corresponding female dies and being perforated along predetermined number of lines, the male dies 32 being driven by the rollers 37 and chains 38, the latter serving to strip the perforated sheet from the dies, and the rollers 37 not only serving to drive the dies 32, but in conjunction with the supporting roller 34, serving to smooth out the broken ridge or raw edge that is formed at the line of cutting or perforation. The sheet is passed from the machine onto a discharge table 2$^a$, the same being supported in any desired way, as by a strut 3$^a$ supported upon any desired portion of the machine framework. It is to be particularly noted that the sheet is carried straight through the machine from the feeding table to the discharge table and not fed downwardly, as has heretofore been customary, after leaving the cutters or perforating devices.

I stated at the beginning of the specification that one of the objects of my invention was an improved construction and arrangement of cutter heads or male dies, the same being independently driven, as before pointed out, and being also independently controllable, whereby one male cutter can be operated to perform straight line work, while the one next to it can be doing stub line or skipping work. I shall now describe how this is accomplished in the present embodiment of the invention and shall also describe the preferred specific construction of the male dies 32, the female dies 31 and the smoothing rollers 37.

Each of the male dies 32 is carried by an arm 39 which is mounted intermediate of its ends to tilt upon a transversely extending rod 40 mounted above the rollers 37. Each arm 39 is preferably provided at its rear end with an anti-friction roller 41 designed for engagement by a cam lug 42 secured in any desired way, and preferably in a detachable or adjustable manner, to a cam disk 43, the cam disks being all secured, as by set screws on sliding key and key-way upon the shaft 17. The forwardly projecting ends of the arms 39, in which the dies 32 are journaled, are pressed downwardly by leaf springs 43$^a$, the tension of said springs being adjusted by means of set screws 44 carried by clamps 45 adjustably held upon a transverse bar 46 extending over the series of arms. The springs 43$^a$ are secured by screws or similar fastening devices, as best illustrated in Figs. 2, 5 and 15 to set collars 47, said collars being received in recesses 48 formed in the arms 39 and being secured to the rod 40 by set screws 49, said collars 47 thereby serving to hold the arms 39 against lateral displacement while permitting them to freely rock on the rod 40 as an axis and said collars also serving to support the springs 43$^a$. It will thus be understood, by referring particularly to Figs. 4 and 5, that when it is desired that any of the cutters shall do skipping or stub line work, a cam lug 42 is secured to the disk 43 of that cutter and at the required position on the periphery of the disk 43 according to the particular point it is desired the male cutter shall rise, the length of the lug manifestly determining the dwell or duration of time the male die shall remain in its raised inoperative position according to the required length of the skip. Hence, as the shaft 17 rotates, those disks 43 that are thus provided with cam lugs will operatively engage and depress the rear ends of the corresponding arms 39 so as to raise the male die or dies, see Fig. 5, it being particularly noted that the male dies are independently driven and are rendered independently controllable, whereby any one or more of them may do straight line work and the others stub line or skipping work. The raising of any of the male dies 32 does not interfere with or affect the continuous rotation of any of the smoothing rollers 37. Figs. 4 and 5 show a sheet passing through the machine, Fig. 4 illustrating a male die in its lowered position and the roller 34 and its superposed roller 37 smoothing out the bur, while Fig. 5 illustrates the same male die held temporarily raised to skip a portion of the sheet.

In the present embodiment of the invention, the male dies 32 are journaled in forks 50 that are formed in the forward ends of the arm 39 (see Fig. 14), and each male die is composed of a hub portion 51 preferably formed integral with a flange or disk portion 52, and a ring 53 which holds between it and the adjoining disk portion 52 a preferably thin sheet metal disk 54, the periphery of which is notched or otherwise formed according to the particular operation required of it. Screws 55 connect the disk portion 52 of the die to the ring 53 and pass through the disk 54. The ring 53 is formed with sprocket teeth 56 for engagement by the chain 38. In the present embodiment of the invention, the female cutter 31 comprises a hub portion 57 adapted to be secured to the shaft 30 by a set screw 58, a disk portion 59 preferably formed integral with the hub 57 and provided in one face with a preferably undercut circular groove 60 which co-acts with a corresponding groove 61 formed in the adjoining face of a ring 62. The disk portion 59 is also formed with any desired number, (three in the present instance) of blocks into which screws 64 extend, the heads of the screws being adapted to extend over the ring 62. The blocks 63 are formed with a tapered lug 65 which extends into the circle of the two opposing grooves 60 and 61, and the ring 62 forms a clearance space 66 which communicates directly with the grooves 60 and 61 that together constitute the slot for the disk 54. By this construction and arrangement of parts, the female dies are rendered self-clearing, the small particles of paper cut from the sheet falling out through the clearance space 66 and this action being facilitated by the tapered lugs 65.

The smoothing rollers 37 are, in the present embodiment of the invention, each composed of a hub portion 67 adapted to be secured to the shaft 36 by a set screw 68, an intermediate main body portion 69 and a series of sprocket teeth 70 that are designed to co-act with the teeth 56 of the male dies 32 for engagement by the driving and stripping chains 38. The tread surface of the roller 37 is formed by a separate ring 71 which is preferably formed with side flanges, as best illustrated in Fig. 11, said tread ring being yieldingly held around the main intermediate portion 69 of the roller for both a rotary and circumferentially independent movement, by means of springs 72 that are three in number in the present instance secured in equidistant relation to each other to the periphery of the portion 69 by screws 73.

As my machine is obviously applicable for use as a cutting or scoring machine, as well as a perforating machine, or as a machine for in any way producing a weakening line or lines in a sheet, it is to be understood that, in the annexed claims, wherever the terms cutter, die, or means for cutting are employed, the same are to be construed broadly as a device or means for in any wise producing weakening lines in a sheet, whether the sheet be scored, partially cut through its surface, perforated, or otherwise weakened.

Having thus described the invention, what is claimed as new is:

1. A machine of the character described, embodying means for cutting sheets of material, and means for smoothing out the sheets on the line of cutting comprising a supporting roller, and a smoothing roller co-acting therewith and between which the sheet passes, the smoothing roller being a positively driven roller and provided with an independently movable tread ring, and springs supporting said tread ring for an independent circumferential and radial movement.

2. In a machine of the character described, means for cutting sheets of material, and means for smoothing out the sheet on the line of cutting, comprising a supporting roller, a positively driven shaft, and a roller mounted on said shaft and movable therewith, the last named roller being provided with an independently movable channeled tread ring, and springs carried by said last named roller and having their ends frictionally engaging the channeled tread ring.

3. In a machine of the character described, independently driven cutters, and means for automatically moving one of said cutters to an inoperative position independently of the others.

4. In a machine of the character described, a plurality of rotary cutters, and means for automatically holding one of said cutters temporarily in an inoperative position independently of the others.

5. In a machine of the character described, a plurality of cutters, means for continuously driving one cutter independently of the others, and means for temporarily holding one cutter in an inoperative position independently of the other.

6. In a machine of the character described, a rotary cutter, a smoothing roller, and an endless driving connection between the cutter and roller, said connection being adapted to strip a sheet from the cutter.

7. In a machine of the character described, a plurality of rotary cutters, arms in which said cutters are journaled, said arms being pivotally mounted intermediate of their ends, one independently of the others, and means for rocking one of said arms independently of the others.

8. In a machine of the character described, a plurality of rotary cutters, supporting arms in which the cutters are respectively mounted, said arms being pivotally mounted intermediate of their ends, one arm independently of the other, and independent cams arranged to engage said arms to rock the same, for the purpose specified.

9. In a machine of the character described, a plurality of rotary cutters, independently movable arms in which said cutters are journaled, means for supporting said arms intermediate of their ends for a rocking movement, a shaft, a series of independent and laterally adjustable cam disks secured on said shaft, and means for effecting an engagement between one of said disks and one of said arms to rock the latter.

10. In a machine of the character described, a plurality of rotary cutters, a plurality of independently movable rocking arms in which the cutters are respectively journaled, means for rocking said arms, springs arranged to press said arms toward their operative position, and means for varying the tension of said springs.

11. A machine of the character described, embodying a plurality of rotary cutters, independently movable arms in which the cutters are respectively journaled, a support on which said arms are mounted for a rocking movement, means for rocking said arms, springs pressing on said arms and exerting a tension thereon to move the arms toward their operative positions, a bar extending transversely across the arms, clamps carried by said bar, and tension adjusting screws carried by said clamps and bearing upon said springs.

12. A machine of the character described, embodying a plurality of rotary cutters, arms in which said cutters are respectively journaled, said arms being respectively formed intermediate of their ends with a recess, a set collar for each of said arms, a support on which said set collars are mounted, the set collars being received in the recesses of the arms and arranged to prevent lateral displacement thereof while permitting a rocking movement, and means for rocking said arms.

13. A machine of the character described, embodying a plurality of rotary cutters, arms in which said cutters are respectively journaled, said arms being respectively formed intermediate of their ends with a recess, a set collar for each of said arms, a support on which said set collars are mounted, the set collars being received in the recesses of the arms and arranged to prevent lateral displacement thereof while permitting a rocking movement, means for rocking said arms, and springs secured to the set collars and bearing upon said arms.

14. A machine of the character described, embodying a rotary cutter comprising a hub portion provided with a disk portion, a clamping ring adapted to be slipped over the hub portion, a cutter disk clamped between the disk portion and ring, and sprocket teeth formed on said ring.

15. A machine of the character described, embodying a female die comprising a hub portion provided with a disk portion, a ring, the opposing faces of the ring and disk portion being formed with circular recesses, and means for securing the disk portion and ring together with the recesses in communication with the interior of the ring, the latter being open and constituting a clearance space for cuttings.

16. A machine of the character described, embodying a female die comprising a hub portion provided with a disk portion, a ring, the opposing faces of the ring and disk portion being formed with circular recesses, blocks carried by the disk portion, and screws working in said blocks and adapted to engage the ring to hold the latter in operative relation to the disk portion.

17. A machine of the character described, embodying a female die comprising a hub portion provided with a disk portion, a ring, the disk portion being formed with blocks and with outwardly projecting tapered lugs, and screws working in said blocks and arranged to engage the ring to hold the latter in operative relation to said disk portion.

18. A machine of the character described, embodying a framework, feeding-in rolls journaled in said framework at one end thereof, a supporting roll journaled in the framework at the opposite end thereof, smoothing rollers arranged in superposed relation to the supporting roller, means for driving said rollers, a plurality of female dies interposed between the supporting roller and one of the feeding-in rollers, a plurality of rotary cutters supported between the smoothing rollers and the other feeding-in roller, and means for independently driving the rotary cutters.

19. A machine of the character described, embodying a supporting framework, a feed table arranged in juxtaposition thereto, a feeding cross head arranged to reciprocate in said table, a shaft journaled in the framework, a crank connected to said shaft, a pitman connection between said shaft and said cross-head, another crank connected to said shaft, a cam arranged to engage said last named crank to turn the shaft in a direction to draw the cross-head inwardly, and means for turning said shaft in the opposite direction.

20. In a machine of the character described, the combination with cutting mechanism, and rollers arranged to feed a sheet to the cutting mechanism, of a table arranged in juxtaposition to said rollers, a cross-head operating in said table, a shaft, a crank connected to said shaft, a pitman connecting said crank to the cross head, means for intermittently turning said shaft in a direction to draw the cross-head inwardly, and a weighted arm connected to said shaft and arranged to turn the same in a direction to move the cross-head outwardly.

21. In a machine of the character described, the combination with a supporting framework and feeding-in rollers journaled in said framework, of cutting mechanism mounted in the framework and arranged to receive a sheet from said rollers, means including a shaft for intermittently moving the cutting mechanism to an inoperative position, a rotary cam carried by said shaft, a feed table arranged in juxtaposition to said rollers, a gage bar operating on said table, means operated by said cam for intermittently and positively moving the gage bar toward said rollers, and means for moving said gage bar away from said rollers.

22. In a machine of the character described, a plurality of rotary cutters, and means for automatically holding one of said cutters temporarily in an inoperative position independently of the others at regularly succeeding intervals.

23. In a machine of the character described, a plurality of rotary cutters, arms in which said cutters are journaled, said arms being pivotally mounted one independently of the others, and means for intermittingly rocking one of said arms independently of the others.

In testimony whereof, I affix my signature in presence of two witnesses.

GEORGE A. HOUSAM. [L. S.]

Witnesses:
ETHEL FOWLER,
JAMES O. CALKINS.